UNITED STATES PATENT OFFICE.

JOHN F. GESNER, OF NEW YORK, N. Y.

ARTIFICIAL SOLID MATERIAL.

SPECIFICATION forming part of Letters Patent No. 419,657, dated January 21, 1890.

Application filed October 25, 1888. Serial No. 289,104. (No specimens.)

*To all whom it may concern:*

Be it known that I, JOHN F. GESNER, of New York, in the county and State of New York, have invented a new and useful Artificial Solid Material, of which the following is a specification.

In order to convey a clear idea of the nature of my product and the process of production, I will first state some of the chemical and physical characteristics which I have ascertained by experiment of certain of the materials employed by me. When the soluble alkaline silicates of soda and potash, ordinarily known as "soluble glass," are left exposed to air for some time, they gradually lose a portion of their contained water from evaporation, dry to a certain extent, and acquire a considerable degree of hardness. Especially is this the case if they have been previously mixed with a portion of earthy mineral matter not capable of decomposing them—such as clay, chalk, silica, natural stone, &c. At the same time such mixtures shrink and warp considerably in drying under ordinary circumstances, and are consequently liable to get out of shape if molded in the ordinary way into any particular form or pattern. Mixtures of this kind sometimes become very hard, resembling stone, and may be used as such or for cements where water is not liable to come in contact with them, but rapidly deteriorate when exposed to moisture, and are practically useless to withstand the climatic influences of the weather as artificial stone, on account of the solubility of the alkaline silicates contained in them. The soluble alkaline silicates moreover in said mixtures, under ordinary atmospheric temperatures and conditions, and unless exposed to a temperature of 212° Fahrenheit or above, always retain a large proportion of combined water or water of crystallization. It is mixtures of this kind that it has hitherto been sought to decompose or render water-proof for use as artificial stone. For this purpose the mixture of soluble glass and earthy mineral matter—such as chalk, clay, &c.—has been sprinkled while still wet, or after ordinary drying in the air, with chloride of calcium or other decomposing salt, or immersed in a solution of the same, for the purpose of decomposing the soluble silicate in the mixture and precipitating an insoluble silicate in its place. On account, however, of the want of thorough dryness and lack of porosity, or rather cellular structure of the material sought to be decomposed in this way for the formation of another insoluble material, any decomposition that takes place under these circumstances is slight and merely superficial, and leaves the interior portion of the mass entirely untouched by the decomposing solution. To remedy this want of porosity sand has been used to mix with the soluble glass, with or without the addition of other mineral matter, and various devices have been employed to cause the solution of chloride of calcium or other decomposing solution to effect a more thorough decomposition of the material under treatment—such as attempting to force the decomposing solution into the mass by an air-pump and immersion of the material into heated a decomposing solution—but all to little avail. By the use of the sand, moreover, a coarse-grained stone only can in any case be formed, whereas by my process, on the contrary, I can make stone of the most pulverulent substances, and consequently of the finest grain. Mixtures of soluble glass and mineral matter have also been cast or molded first without the simultaneous application of heat or pressure, and then removed from the mold and dried in the air or by artificial means, without being calcined, and the said mixtures have been vitrified at a baking heat in kilns, thereby rendering them both impervious to and undecomposable by the chemical agents I employ.

I have found by experiment that if soluble glass, after ordinary drying in the air, be submitted to a temperature above the vaporizing temperature of the solvent, but below the vitrifying temperature, for the purpose of driving off the combined water (if the solvent be water) or water of crystallization without vitrifaction the material does not become friable, dry into a powder, or lose its cohesive power, as many salts do under similar conditions, but swells, puffs up greatly into a shapeless mass as the heat is increased, and finally dries into a very hard light porous material. This treatment I refer to as "calcining." If the material under these conditions of heat be at the same time closely confined or submitted to pressure, while attaining perfect dryness and a high degree of porosity and hardness during this process of calcination, it can be made to retain any shape into which, while in a hydrous, soft, and plastic condition, it may originally have been molded. The confinement or pressure during calcination is for the purpose of causing the material to retain the shape to which it has been cast or molded and to preserve a certain degree of density in it without impairing its porosity; but I can and do employ in certain applications the product made with the omission of the confinement or pressure. I have found that the porous material thus formed, being deprived of its moisture, is deprived of its liability to shrinkage or warping, and, furthermore, by reason of being porous and anhydrous throughout, it is peculiarly adapted to be impregnated and decomposed by any chemical agent by which it is to be converted from a soluble into an insoluble body. It also has a peculiarly hard character, which it did not heretofore possess nor attain by ordinary drying, retaining this hardness to a great extent after the soluble glass in it has been decomposed and replaced by other chemical substances. I may stop the process at this point and apply the product thereof to the arts, which product may be varied by the use of soluble glass alone or in admixture with other materials. The product, however, at this point still contains the silicate in a soluble state, and I prefer to continue the process as follows to convert it into an insoluble body. I immerse the material already produced into a saturated cold or hot solution of any chemical body having the property of converting the soluble glass into an insoluble body. On account of the porosity of the calcined material and its dryness the converting solution is rapidly absorbed into its pores and a thorough conversion of its contained soluble glass is insured. The material still retains its porosity after the last treatment, and a thorough and rapid removal of the soluble salts resulting from the treatment can be readily effected by washing. When taken from the bath of the decomposing solution, a change is found to have taken place in the chemical and physical constitution of the material. The soluble silicates have been replaced by silica or a silicate of another base, according to the character of the converting solution used, the excessive hardness and brittleness of the calcined material have disappeared, and it has become considerably softer. It still retains, however, to a remarkable degree the peculiarly hard and compact character which it possessed when first taken from the calcining-press, if pressure had been employed in the calcining operation. The material resulting from the last operation may be applied to various uses; but I prefer to subject it to the following additional treatment in order to expel from it the superfluous moisture it contains. For this purpose I submit it again to heat and pressure, after which, to prevent it again taking up water, I may fill its pores with a water-resisting substance.

Having thus outlined the process for producing my product, I will proceed to describe more particularly each step and its variations.

For the production of material which I call "hyalo-hyaloid" I apply my process to soluble glass alone, being the ordinary commercial article of specific gravity from 35° to 40° Baumé. This I do by first allowing a solution of it to dry in the air until sufficiently hardened to be readily handled. It is then calcined under pressure, as more particularly described hereinafter. Generally, however, the same character of soluble glass will be treated in admixture with some solid substance or substances in a divided state, with which it is mixed in a pug-mill or mixer until, by evaporation or otherwise, it has acquired the consistency of a stiff paste or of dough, the proportions varying, generally, for each part of soluble glass from one to three parts solid substance.

I do not intend to limit myself in this application either to the product produced by the treatment of the soluble glass alone or by its treatment in admixture with other substances, since the object of this application is to cover the product broadly and to leave claims for the more specific products resulting from various mixtures to subsequent applications.

To submit the soluble glass prepared as above, whether alone or in admixture, to calcination, I spread or place it between two opposite and parallel hot metallic molds or forms, which, corresponding in shape and pattern and fitting upon or into each other, can be brought together in contact or separated at pleasure by proper mechanical means. The simplest form of press I may use consists merely of two metallic plates, which are first heated to the required temperature by any exterior source of heat and then placed horizontally one above and one below and in contact with the material to be calcined, which I thus confine and calcine between and in contact with hot surfaces, the edges of the material being also preferably confined. The interior of these plates may be made hollow and capable of being filled with steam, &c., or of having heat communicated to them in place by any other appropriate means in any other convenient manner, such as by the circulation through them of hot air or hot liquids or by the contact of naked flames, &c., so as to avoid the necessity of removing them for the purpose of reheating them when they become cold. The most approved apparatus is described in my appication for Letters Patent No. 271,523, filed April 23, 1888.

In some cases in order to hasten the process I may effect a partial drying in the air of the soluble glass in admixture or otherwise after molding or pressing it into any given form or shape I may require it to take before submitting it to the joint action of heat and pressure, since when first exposed to a heat above 212° Fahrenheit as the soluble glass begins to lose its water of crystallization the partially dry and hard material becomes soft again and readily takes the required shape of the mold. In order to facilitate this preliminary drying, I may remove the material entirely from the mold or the mold partially or entirely from the material after casting and expose the material to the air or to artificial heat until it has set or hardened or acquired some degree of hardness from the evaporation of a portion of its contained water, when I return it to my molding-press to undergo my process of drying and calcination by the direct application of heat and pressure. I take care, however, not to allow the material so drying in the air unless under pressure to set or get so hard as not to become soft or somewhat plastic again when I place it in my molding-press, as it may warp and shrink so much, get so much out of shape, and lose so much moisture, if too long exposed to the air after mixing, as to become incapable of softening again sufficiently in the molding-press to flatten out again or to take the required shape of the mold. The proper and gradual drying and subsequent calcination of the material, while preserving at the same time its original form or pattern that may have been given to it, require some degree of skill, which can be readily acquired by a little practice and experience. Having placed my mixtures of soluble glass then in what I will hereinafter denominate my "calcining-press," I first apply to the plates of said press and keep up a temperature a little below or about 212° Fahrenheit until I have expelled superfluous mechanically-contained moisture from the material, or until I have brought about the solidification of the soluble glass contained therein, if this has not already sufficiently hardened by having been previously air-dried or reduced to the ordinary state of dryness which it gradually attains after a few days' exposure to a dry atmosphere of average temperature.

To prevent the material adhering to the plates of the press during the process of drying and subsequent calcination, I sprinkle plentifully both the plates of the press with which the material may be brought in contact and the material itself with fine dry powdered chalk, clay, silica, &c., or other fine dry absorptive mineral matter, or I whitewash the sides of my press with the same and allow it to dry, or I may interpose cloth well dusted over with the said dry mineral matter between the material to be dried and calcined and the plates of the press, and which may afterward be readily stripped from the material. I then keep gradually increasing the heat above the temperature of 212° Fahrenheit until all the combined water or water of crystallization of the soluble glass under treatment has been expelled in the state of vapor and it has attained a very porous and perfectly anhydrous condition. This gradual increase of heat can be conveniently effected by carefully regulating, by means of a stopcock, the amount and pressure of the steam admitted to the hollow plates of the calcining-press. In some cases I may use superheated steam in my press when a high temperature is required.

During the process of gradually expelling the combined water from the soluble glass in the mixture by a gradually-increasing temperature from 212° Fahrenheit upward under pressure an infinite number of vapor-vesicles are formed, and owing to the nature of the material these are caught and imprisoned in its substance as it gradually acquires an increasing degree of hardness from the expulsion of water. These vapor-vesicles constitute a multitude of extremely-fine pores, which, finally coalescing and communicating with one another to a greater or less extent throughout the mass of the material during the process, afford a means of escape to the exterior for all interiorly-confined moisture. The material thus attains a state of porosity or cellular structure similar to that which well-leavened bread acquires in the processes of rising and baking. The pressure or confinement to which it is subjected in the meantime prevents the soluble glass from attaining the formless spongy condition which it would otherwise do, and stamps and leaves upon it the original impression or pattern of the calcining-press. The object of gradually raising the heat is to give time for the moisture near the surface to escape first through the porous substance of the material thus formed and by degrees in this way to work toward and into the interior of the material. Some skill and judgment are required here to avoid forcing the process or raising the heat too rapidly and too high, as in this case the material may become so spongy and porous as to lose proper solidity and tenacity. On the other hand, if the applied heat be not high enough or not maintained a sufficient length of time the material will not be thoroughly calcined, and therefore not susceptible of subsequent thorough decomposition. No harm to the material can result from an unnecessarily long exposure to heat, so long as the temperature be not raised so high as to produce decomposition or vitrifaction. The pressure and heat must be so adapted to each other and the duration of their application so adjusted that the material may not lose density and firmness, while retaining at the same time a high degree of porosity.

Care must be taken to avoid the sudden application at first of a high temperature to the material under confinement, as this would cause the rapid evolution of a large volume of steam, defeating the object of the process and possibly acting with destructive effect. The degree or intensity of heat to which I may ultimately raise the plates of my calcining-press and the time required for its application will depend entirely upon the kind and the thickness of the material to be treated confined between them.

To treat a mixture of one inch, or thereabout, in thickness, I may employ a gradual increase of heat after ordinary drying or setting from 212° Fahrenheit to between 400° and 500° or higher for twelve hours. In this case I may use superheated steam for the heating medium in my calcining-press. If the higher temperature above given would be destructive of the ingredients mixed with the soluble glass, the temperature must be confined to the lower degrees. I continue the heat applied to my calcining-press at its maximum for a considerable time after there is no longer any apparent evidence of escaping steam or moisture from the mixture when the process is finished.

The amount of pressure required to be exerted on the material by the plates of the calcining-press will depend upon the kind of material to be treated and the sort of product desired. Simple close confinement may sometimes be sufficient if the material be thin, of small superficial dimensions, and not to be impressed with any pattern, but made plain or flat; or if the object of the applied pressure or confinement be merely to keep the material in shape and to prevent its puffing up too much. If a pattern is to be stamped upon it, however, some pressure will be required, and this will vary somewhat, according to the thickness and bulk of the material. The greater the thickness and superficial dimensions of the mixture the greater will be the pressure required, and vice versa. The pressure applied must be sufficient to effect at first the expansion of the material, and as it afterward shrinks the pressure must be maintained upon it to cause it to take and retain a sharp impression of the mold. If a material of greater density be required, hydraulic or similar pressure may be applied during the process of calcination, care being taken in this case to increase the temperature gradually, so as to allow the vapor generated to escape slowly, regularly, and by degrees in small portions at a time. The greater the applied pressure the longer time it will require to calcine the material and the denser will be the resulting product; but the pressure or confinement must never be so great as not readily to allow of the free escape of vapor from between the material and the plates of the calcining-press or from the material itself. The pressure upon the plates of said press should be elastic enough to yield somewhat against the expansion of the material as it begins at first to part with its combined water, and, while strong enough to follow up and maintain a pressure upon the said material as it afterward contracts from the expulsion and loss of said water, not so strong as to confine the escaping steam too much.

A little experience in practical working on the part of the intelligent workman will soon enable him to judge correctly of the intensity of the heat and the time and pressure required for the particular kind and thickness of material he may be treating.

When I take the material from the calcining-press, I find that it has undergone a great physical change. It has become much harder than before and of an entirely different character from ordinary dry mixtures of soluble glass which have hitherto been known and obtained by drying the same in the air. There has been set up in it a highly porous and absorbent condition, similar to that of earthenware or porcelain in the state of "biscuit" preparatory to glazing. Although very porous, the material has become very solid, harsh, and gritty, so as to quickly wear away any edge-tool that may be employed to cut or saw it.

Having thus applied the first step of my process, I will now describe particularly the application of the step which converts the soluble glass in my material into insoluble matter. In order to render my material essentially water-proof in itself, the soluble alkaline silicates in it must be replaced by other compounds which are insoluble, and this is effected by bringing it in contact with a solution of chemical agents capable of decomposing soluble glass. Hitherto chloride of calcium has been chiefly recommended or used for this purpose, although a few other salts have also been suggested. I have found by careful experiment that, besides these, a large number of other chemical compounds in solution are capable of effecting this decomposition. Such are the ordinary free acids and the soluble oxides and salts of the metals other than those generally of the alkaline metals, except some of these in double salts, as in some of the so-called "alums." Among the most important and available of these are—soluble free acids: sulphuric, hydrochloric, nitric, tartaric, acetic, oxalic, boracic, citric, phosphoric, sulphurous, arsenious, arsenic; soluble oxides: barium hydroxide, strontium hydroxide, chromium, trioxide or chromic acid; soluble salts: calcium nitrite, hypophosphite, hyposulphite, sulphide acetate, chloride; strontium, chloride, nitrate; barium: chloride, nitrate, sulphide; magnesium: chloride, hypochlorite, sulphite, hyposulphite, sulphate, nitrate, acetate, phosphite, hypophosphite, tungstate; zinc: chloride, sulphate, acetate, sulphite, nitrate, hypophosphite, chlorate; lead: nitrate, acetate; copper: chloride, sulphate, nitrate, acetate; mercury: bichloride; aluminum: sulphate, acetate, chloride, nitrate, hyposulphite, hydrochlorite, sulphite; manganese: chloride, sulphate, acetate; iron: chloride, sulphate, nitrate, acetate, sulphite; nickel: chloride, sulphate, nitrate, acetate; chromium: sulphate, potassium and chromium sulphate, ammonium and chromium sulphate, potassium bichromate, sodium, bichromate; tin: protochloride, sulphate, hyposulphite; antimony: antimony and potassium tartrate. Besides these there are some chemical compounds and mixtures which can best be described by their ordinary commercial names, such as superphosphate of lime, bisulphite of lime, chloride of lime or bleaching-powder, pyrolignite of lime, the alums, aluminous cake, &c. Other decomposing compounds may be found cheaper and more available in the future.

I do not confine myself to decomposing compounds that are soluble in water only or to aqueous solutions of the same merely; but I may sometimes use as solvents for my decomposing agents other menstrua, such as acids, alkalies, alcohol, &c. I therefore in the dry calcined and pressed condition of my material which I have described immerse it into a saturated cold or hot solution of the kind of chemical bodies I have indicated. On account of the great porosity of the calcined material thus prepared and its perfect dryness, the decomposing solution is rapidly absorbed into its pores, and a thorough decomposition of its contained soluble glass insured. Moreover, the material still retaining its porosity after decomposition, a thorough and rapid removal of the soluble salts resulting from the said decomposition can be readily effected by washing. The time necessary for its thorough decomposition will depend upon the kind and thickness of material to be treated; but generally from six hours to twenty-four hours will be sufficient.

The character of the decomposition which takes place will depend upon the kind of decomposing solution used. If a dilute acid be employed, it abstracts soda or potash from the alkaline silicate in the mixture, forming a soluble salt, and precipitates free insoluble silica. If a simple metallic oxide not of an acid character be used, it abstracts the silica or silicic acid from the alkaline silicate, forming an insoluble metallic silicate, which is precipitated, while soluble soda or potash is set free. If, again, a metallic salt be the decomposing agent, a double composition takes place, the silica in the soluble glass abstracting the base of the metallic salt, forming an insoluble metallic silicate, which precipitates, while the acid of the metallic salt thus set free combines with the freed base of the alkaline silicate, forming a soluble salt. The choice of these and other similar decomposing soluble substances will depend upon their cheapness and availability. Care must be taken in their selection not to employ one which is apt to exert a decomposing action upon any one of the ingredients in the mixture under treatment. I prefer for general use an aqueous solution of a metallic salt with an acid reaction—such as ferrous sulphate, aluminum sulphate, the alums, &c. A strong and better product seems to result from the use of this kind of decomposing agent from the consequent precipitation of an insoluble metallic silicate than from that resulting from the use of dilute acids where merely insoluble silica is precipitated.

It is now desirable to wash out the soluble oxides or salts contained in the material and compress and dry it, although in some cases where the retention of the soluble salts would not interfere with its appearance or applications it may be compressed and dried at once for use without further treatment. Heretofore washing has been effected by immersion of the material for a time in still or running water or exposure to the action of steam, and this for ordinary purposes may be sufficient; but when a fine product is to be produced that will not effloresce I have found that spraying water in fine jets on the material is more effective, besides resulting in a great saving of water, which is sometimes an item of expense. For this purpose I hang up the material to be washed in a chamber where fine jets of water are arranged to play in a spray upon it for from six to twenty-four hours, according to the thickness of material or until it is sufficiently free from soluble substances.

The decomposed material when first taken from the decomposing-bath, or after washing to remove the soluble salts in it, is so thoroughly saturated with moisture that it may be somewhat spongy and fragile, and liable also to lose somewhat on this account its original form or shape, especially if it has been molded to any fine pattern. To make it retain its original shape or form to which it may have been molded, to increase its density, and to expel from it all superfluous moisture, I may again submit it to pressure and heat in the same press or in a similar one which I have already used for calcining it and which I have described above as my "calcining-press." In this part of my process I may also use hydraulic pressure in a hydraulic or other press with or without the aid of heat, so as materially to increase the density and hardness of the material thus treated. As the material after this treatment still remains very porous unless it has been previously submitted to hydraulic pressure, referred to above, I may in some cases, in order to render it impervious to water, especially when it is to be exposed to the weather, cover it or fill its pores with a water-resisting substance. This I accomplish conveniently either by painting, japanning, varnishing, or lacquering it, or by immersing it in a waterproof substance which has been melted, fused, or brought into a state of solution or liquid suspension until it is covered or its pores are filled with the same, when I take it out and allow it to dry or cool. Convenient substances for the latter purpose named are melted or dissolved paraffine or wax, drying-oils, melted or dissolved asphaltum, sulphur, india-rubber and gutta-percha, tar, fused or dissolved insoluble metallic soaps or insoluble metallic oleates or stearates, alcoholic, alkaline, or other solutions of the resins, gums, &c. The substance when complete in its frame-work or structure by which the whole is knit together consists of an insoluble compound of silicon (silica or silicate of lime, &c.) in a porous or cellular condition. With this framework may be combined some water-resisting material injected into the pores, and there may also be combined foreign solid substances, between the particles of which the insoluble compound of silicon occupies the relationship of a skeleton or frame-work uniting or cementing the whole together.

I claim—

1. An artificial product the tissue or contexture of which consists of a compound of silicon substantially free from water of crystallization in the form of a solid cellular mass, substantially as described.

2. An artificial product the tissue or contexture of which consists of an insoluble compound of silicon in the form of a cellular mass, substantially as described.

3. An artificial product consisting of particles of a solid knit together by a tissue or contexture consisting of a compound of silicon substantially free from water of crystallization in the form of a solid cellular mass, substantially as described.

4. An artificial product consisting of particles of a solid knit together by a tissue or contexture consisting of an insoluble compound of silicon in the form of a cellular mass, substantially as described.

5. An artificial product the tissue or contexture of which consists of an insoluble compound of silicon in the form of a solid cellular mass, the cells of the same being filled with a water-excluding substance, substantially as described.

6. An artificial product the tissue or contexture of which consists of an unvitrified non-alkaline compound of silicon in the form of a cellular mass, substantially as described.

JOHN F. GESNER.

Witnesses:
GEO. WADMAN,
WILLIAM ROBINSON.